United States Patent [19]

Georgens et al.

[11] Patent Number: 4,498,112
[45] Date of Patent: Feb. 5, 1985

[54] TAPE CARTRIDGE RECEPTACLE

[75] Inventors: Harold H. Georgens, Rancho Santa Fe; A. Ray Brokaw, San Diego, both of Calif.

[73] Assignee: Data Electronics, Inc., San Diego, Calif.

[21] Appl. No.: 360,696

[22] Filed: Mar. 22, 1982

[51] Int. Cl.³ .................. G11B 15/66; G11B 23/08
[52] U.S. Cl. ................................. 360/96.5; 360/132
[58] Field of Search ............... 360/85, 93, 95, 96.5, 360/96.6

[56] References Cited

U.S. PATENT DOCUMENTS

| | | | |
|---|---|---|---|
| 3,900,170 | 8/1975 | Serizawa | 360/96.6 |
| 4,050,087 | 9/1977 | Kishi | 360/95 |
| 4,130,848 | 12/1978 | Amano et al. | 360/95 |

Primary Examiner—Robert S. Tupper
Attorney, Agent, or Firm—Christie, Parker & Hale

[57] ABSTRACT

A receptacle for a tape cartridge includes cartridge guide rails for engaging opposite sides of the cartridge housing to guide insertion and removal of the cartridge. The cartridge includes a magnetic tape and a door on the cartridge housing for opening to expose a portion of the tape prior to moving the cartridge into a locked position for engaging the tape with the head. The door is normally spring-biased to a closed position, and one of the guide rails has a door control rail that trips the door open against the bias of the return spring as the cartridge passes along the guide rail. The control rail also includes a ramped recessed portion which engages the door tripping arm and reduces the force applied against the bias of the return spring to permit the door to move inwardly through an angle to a partially open position during the latter portion of its travel into the receptacle. The ramped portion of the control rail controls inward movement of the door to keep the door away from the head during insertion and removal of the cartridge. A stop pin or the like can be provided to engage the inside edge of the door to absolutely prevent movement of the door into contact with the head. In the locked position of the cartridge, the control rail retains the door in its partially open position, which reduces the overall width of the cartridge within the tape drive unit. This reduces the overall size requirement of the tape drive unit, making it possible to construct a tape drive package for ¼-inch magnetic tape cartridges in the same standardized dimensions as 5¼ inch floppy disk drives and Winchester-type disk drives.

19 Claims, 5 Drawing Figures

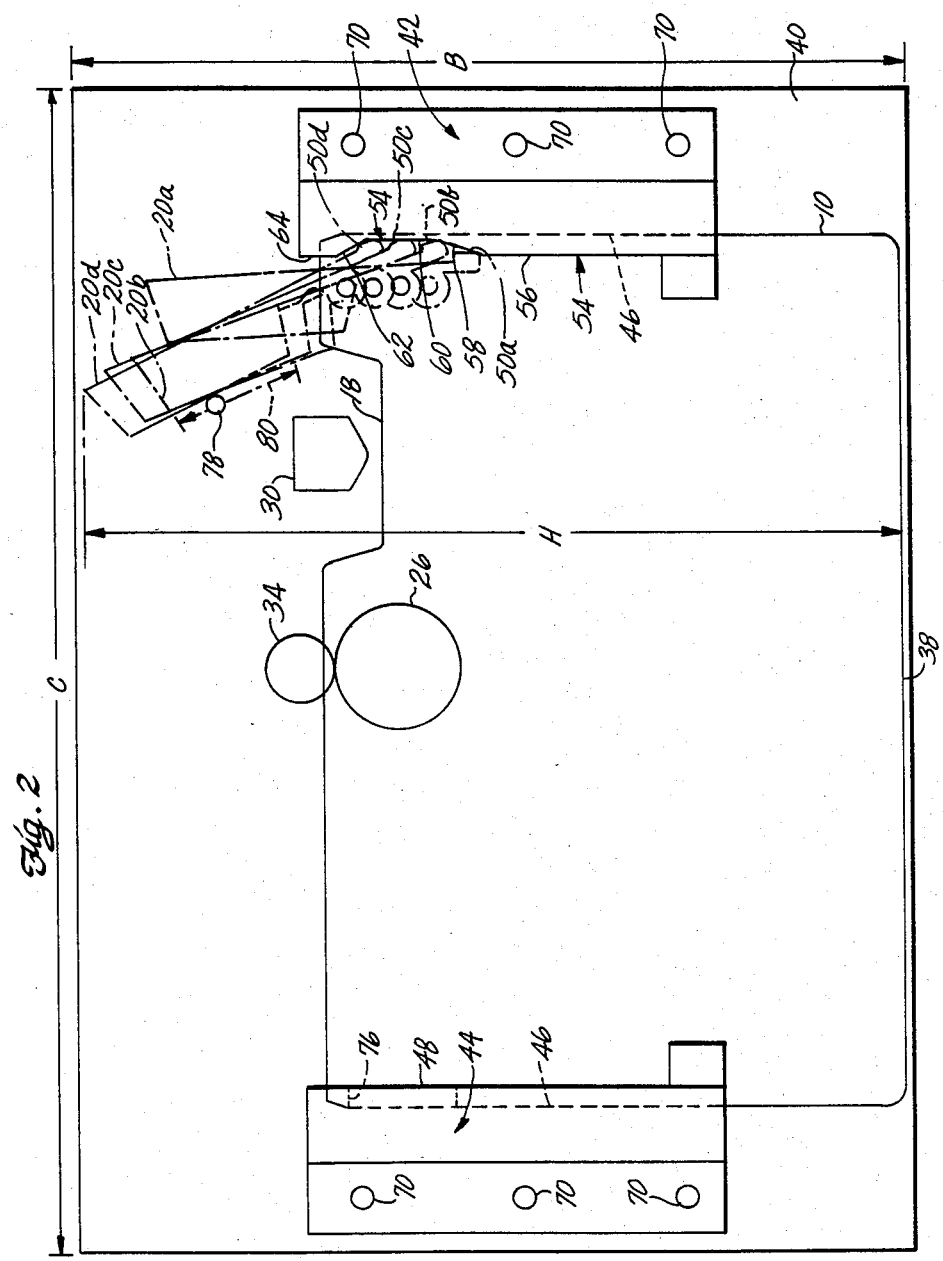

TAPE CARTRIDGE RECEPTACLE

BACKGROUND OF THE INVENTION

1. Field of the Invention

This invention relates to magnetic tape drives, and more particularly, to a receptacle for a tape cartridge.

2. Description of the Prior Art

In recent years, computer technology has greatly expanded the market for computers, including reasonably inexpensive small computers such as personal computers and computers for small businesses. The so-called floppy disk drives provide a common means of data storage for small computers. One floppy disk drive in common use today is the industry standard 5¼ inch minifloppy disk drive. One or more of these disk drives are typically mounted inside the computer console. A diskette is inserted or removed through one or more slots at the front of the console. In other applications, the minifloppy disk drive can be contained in a separate housing for use externally to the computer console. In either instance, it has become an industry practice to provide a 5¼ inch minifloppy disk drive as a package with standard exterior dimensions.

Floppy disk drives have proved to be convenient for many applications such as program loading and data interchange, but they have a limited data storage capacity. Because of this problem, larger capacity disk drives such as the so-called Winchester disk drives have been used in lieu of floppy disk drives in applications requiring greater data storage capacities. The Winchester-type disk drive generally comprises one, two or three hard disks on which data are recorded. A Winchester-type disk drive can provide a much higher data storage capacity and faster data access and data transfer times than a floppy disk drive. Accordingly, a common practice in small business applications is to use a combination of the minifloppy disk and the Winchester disk. In this way, the day's transactions can be recorded on one or two floppy disks and a full copy of the business's transactions can be made on a hard disk at weekly intervals or longer.

Recently, Winchester-type disk drives have been manufactured in a package with the same exterior dimensions and mounting hole locations as a standard 5¼ inch minifloppy disk drive. In this way, the Winchester disk drive can be conveniently installed in the computer console in place of a minifloppy disk drive to provide the larger data storage capacity.

Data storage for computer applications also can be provided by a magnetic tape drive instead of disk drives. In recent years, ¼-inch cartridge tape drives have been replacing floppy disk drives in many applications because the tape cartridges are more compact, can store from about 15 to 50 times more data than diskettes, and have a lower cost per megabyte. The ¼-inch tape cartridges also have a greater data storage capacity than comparable Winchester-type disk drives.

Tape cartridges such as the Scotch DC 300XL data cartridge made by 3M Co. are commonly used for data storage in cartridge drives. Briefly, this type of standard tape cartridge includes a ¼-inch magnetic tape enclosed within a case. The tape is driven, in part, by an internal capstan, a portion of which is exposed at an edge of the cartridge case. When the cartridge is inserted into a receptacle in the tape drive unit, the exposed capstan engages a capstan driven by the tape drive motor for driving the tape. The tape cartridge also includes a door near a corner of the case. The door is normally spring-biased to a closed position for protecting the tape during storage and transport. When the cartridge is inserted in the tape drive unit, the door is tripped open to expose a portion of the tape for engaging the magnetic read/write head on the tape drive unit. The mechanism for guiding the cartridge into the receptacle not only trips the door open, but it also prevents the door from contacting the head when the cartridge is inserted or removed.

The magnetic tape cartridges used in magnetic tape drives are manufactured according to industry standards approved by the American National Standards Institute (ANSI). Magnetic tape drives, including the larger ½-inch tape drives, have been able to replace the industry standard larger disk drives, such as the 8-inch, 10½ inch and 14-inch disk drives. However, the standard ¼-inch tape drive units have not been able to replace either the 5¼ inch minifloppy disk drive or Winchester-type disk drive because the standard size ¼-inch tape cartridge has been too large to fit into a tape drive unit that meets the standard exterior dimensions of the 5¼ inch disk drives. For instance, the standard exterior width of a 5¼ inch disk drive package is 5.75 inches. With the standard size tape cartridge inserted in a standard tape drive and the door on the cartridge held open to expose the tape, the cartridge case and the door in its open position cover a distance of 5.765 inches, i.e., a distance greater than the standard 5.75-inch width of the smaller disk drives.

The present invention provides a tape cartridge receptacle that allows a tape cartridge to be inserted into a tape drive package having the same standard exterior dimensions as the 5¼ inch disk drives.

SUMMARY OF THE INVENTION

Briefly, this invention provides a receptacle for a tape cartridge having a magnetic tape in a case and a door on the case for being opened to expose a portion of the tape. The door is normally spring-biased to a closed position. The receptacle has opposite guide rails for guiding the cartridge into a locked position with the tape contacting the magnetic head of the tape drive unit. The door contacts a door control rail on one of the guide rails to trip the door to its open position so that the tape can engage the head. When the cartridge is fully inserted to its locked position, the control rail which contacts the door holds the door open against the bias of the door's return spring. The control rail portion that contacts the door controls the amount by which the door opens during insertion or removal of the cartridge. The control rail contact with the door allows the door to bypass the head during insertion and removal and also allows the door to open only partially and retains the door in its partially open position when the tape is engaged with the head. In this partially open position, the maximum width of the tape cartridge, as measured from the extreme end of the door to the edge of the cartridge most remote from the door, traverses a distance less than 5.75 inches.

Thus, the tape cartridge receptacle of this invention can be used in a tape drive unit having the same standard exterior dimensions as the standard 5¼ inch floppy disk drive or Winchester-type disk drive. As a result, the user can substitute a tape cartridge drive for the disk drives and gain the added data storage benefits provided by magnetic tape drives when compared with disk drives.

In one embodiment of this invention, the amount by which the cartridge door is opened is controlled by a relief area extending along the door control rail. The relief area reduces some of the pressure on the spring-biased door tripping mechanism to allow the door to pivot inwardly through an angle sufficient to allow the door to bypass the magnetic head and to stay in the partially opened position once the cartridge is locked with the tape against the head.

In another embodiment, stop means are provided to engage the inside edge of the door to prevent the door from moving into a space adjacent the magnetic head, either during insertion or removal of the cartridge, so that the door can be prevented from contacting the head.

These and other aspects of the invention will be more fully understood by referring to the following detailed description and the accompanying drawings.

DRAWINGS

FIG. 2 is a semi-schematic top plan view illustrating a tape cartridge receptacle according to principles of this invention;

DETAILED DESCRIPTION

Figure 1:
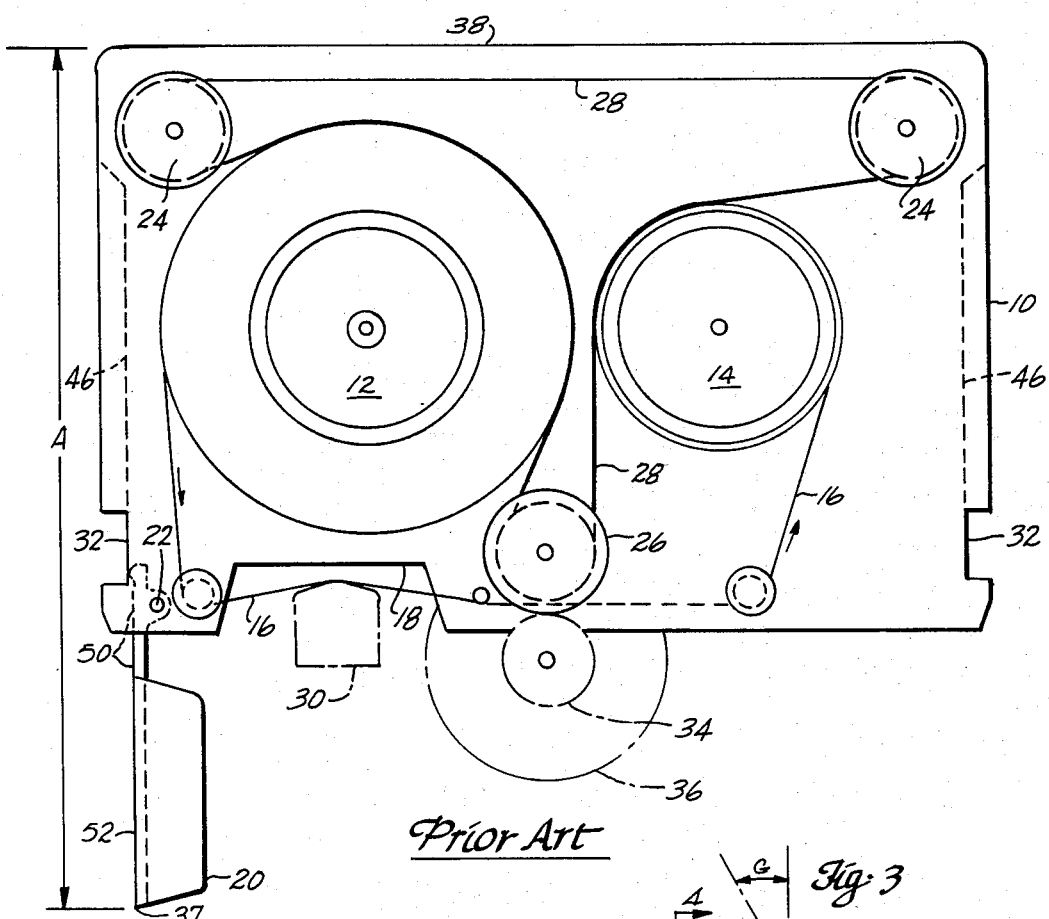
FIG. 1 is a semi-schematic top plan view illustrating a standard magnetic tape cartridge inserted in a tape drive unit with the cartridge door in its open position to expose the tape for contact with a magnetic read/write head.

FIG. 1 illustrates a standard tape cartridge inserted in a tape drive unit. Portions of the tape drive unit are illustrated in phantom lines. The tape cartridge includes a housing 10 containing a pair of tape reels, i.e., a supply hub 12 and a take-up hub 14. A magnetic recording tape 16 wound on both reels passes from one reel to the other. The tape passes through a recessed opening 18 in a leading edge of the tape cartridge housing. A door 20 is mounted to pivot on a pivot pin 22 at a corner of the housing. The door mechanism has a return spring (not shown) that normally closes the door over the portion of the tape exposed in the recess 18. Other portions of the tape cartridge include a pair of belt guide rollers 24 and a belt drive capstan 26 around which a flat drive belt 28 is wound. When the tape cartridge is inserted into a tape cartridge receptacle, the door 20 is immediately tripped open and retained in its open position to expose a portion of the tape 16 in the recess 18 for engaging the tape with a magnetic read/write head 30 of the tape drive unit. The door is held in its fully open position shown in FIG. 1 essentially during the entire length of travel of the cartridge into the receptacle. The cartridge also includes a pair of notches 32 for engaging spring-loaded rollers (not shown) of a locking mechanism in the tape drive that holds the cartridge in a locked position with the tape contacting the head. In the locked position, a drive capstan 34 on the tape drive motor 36 engages the belt drive capstan 26 for driving the tape in the direction of the arrows shown in FIG. 1.

ANSI standards control, among other things, the width of the tape cartridge housing, the location and dimensions of the recess 18, and the location and dimensions of the door 20. This, in effect, controls the maximum width of the cartridge when the door is held in its fully open position during use. The standard distance from the tip 37 of the door in its fully opened position to the trailing edge 38 of the cartridge, as illustrated by the dimension A in FIG. 1, is 5.765 inches. As explained above, this distance is greater than the standard width of the disk drive package for the standard 5¼ inch mini-floppy disk or the 5¼ inch Winchester-type disk drive.

FIG. 2 is a semi-schematic top plan view illustrating a tape drive unit having a tape cartridge receptacle according to principles of this invention. The cartridge receptacle has a cavity for receiving the tape cartridge. The cavity is formed by a rectangular base plate 40 with a maximum width B (or depth) of 5.75 inches and a maximum length C of 8.00 inches. These dimensions are the maximum dimensions of the tape drive unit of this invention and these dimensions are the same as those for a standard 5¼ inch floppy disk drive and a 5¼ inch Winchester-type disk drive.

Right and left cartridge guide rails 42 and 44 extend along the right and left sides of the cavity in the tape drive unit. A standard tape cartridge has a pair of grooves (shown in dotted lines at 46 in FIG. 1) formed along opposite side edges of the housing. The grooves extend between a pair of flanges projecting from the housing above and below each groove. The guide rail 44 at the left side of the tape drive unit is typical of a standard guide rail for tape drives in which an elongated groove 46 extends below a straight guide rail 48. When a cartridge is inserted into the cartridge receptacle, the guide rails on both sides project into the grooves along opposite sides of the cartridge. The lower flanges of the cartridge ride in the grooves 46 below the guide rails to provide means for guiding the sliding movement of the cartridge toward and away from its locked position with the tape against the magnetic head 30. It is common practice to provide a right guide rail assembly that is similar but opposite in configuration to the left guide rail assembly 44 shown in FIG. 2. The straight guide rail along the right side of the receptacle trips the cartridge door 20 open (to its fully open position) and retains the door in its open position. With reference to FIG. 1, the door 20 of a standard tape cartridge has a door control arm 50 which extends to the side of the door pivot pin 22 opposite the door 20. The door control arm has its outer surface in the same plane as the outer surface 52 of the door. When the door is in its closed position, the control arm protrudes in front of the groove 46 in the guide rail along the right side of the cartridge. When the cartridge is inserted into the receptacle, the guide rail engages the control arm and causes the door to rotate into its fully open position, shown in FIG. 1. The cartridge door is tripped open, to its fully open position shown in FIG. 1, immediately upon insertion of the cartridge into the receptacle, and the door is retained in its fully open position as the cartridge is slid lengthwise into its locked position with the tape engaging the head 30.

Referring again to FIG. 2, the right guide rail 42 of this invention has a ramped door control rail 54. The ramped door control rail controls movement of the cartridge door 20 during insertion and removal of the cartridge. The control rail has a straight front portion 56 which projects outwardly from the groove 46 by the same distance as a conventional guide rail assembly. While the door tripping arm 50 of the cartridge is engaged with the front portion 56 of the right control rail, the door 20 is tripped open to its fully open position and remains in its fully open position for approximately two-thirds of the length of travel into the receptacle. At the end of the straight front portion 56, the ramped guide rail has a recessed area which extends for approximately the latter one-third of the length of cartridge travel into the receptacle. The recessed area has a first ramped portion 58 which gradually tapers wider outwardly away from the plane of the straight front portion 56 of the guide rail. The first ramped portion 56 terminates in a short straight portion 60 spaced outwardly from and extending generally parallel to the straight front portion 56. The short straight portion 60 terminates in a short second ramped portion 62 which gradually tapers inwardly toward the plane of the straight front portion 56. The second ramped portion terminates in a short straight portion 64 collinear with the straight front portion 56 of the guide rail.

Figure 4:
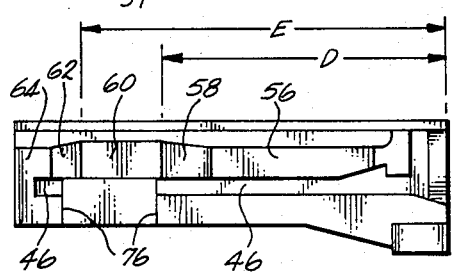
FIG. 4 is a side elevation view taken on line 4—4 of FIG. 3.
Figure 5:
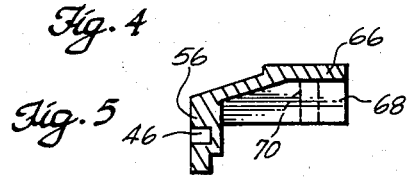
FIG. 5 is a cross-sectional view taken on line 5—5 of FIG. 3.
Figure 3:
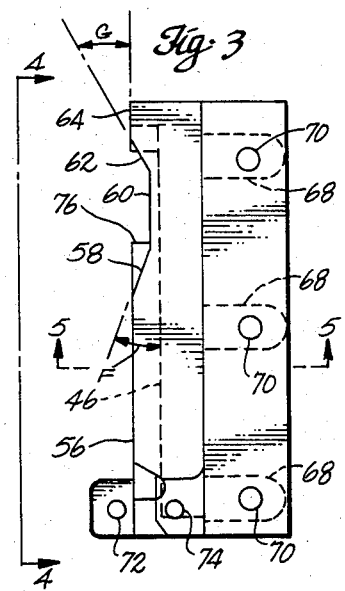
FIG. 3 is a top plan view illustrating the detailed configuration of a cartridge guide rail for controlling the opening of the door of the tape cartridge.

Detailed construction of the right guide rail 42 is best understood by referring to FIGS. 3, 4 and 5. The right guide rail includes an outer mounting flange 66 with spaced-apart ribs 68 on the underside of the flange. Holes 70 extend through the ribs 68. The ribbed mounting flange fits over a mounting block unit (not shown) on the base plate of the tape drive unit. Fasteners (not shown) extend through the holes 70 and into the mounting block for securing the guide rail assembly to the base plate of the tape drive unit. Holes 72 and 74 in the front portion of the guide rail assembly receive fasteners (not shown) for securing the front portion of the guide rail to the base plate of the tape drive.

As shown best in FIG. 4, the narrow groove 46 extends most of the length of the guide rail assembly. The groove 46 is spaced above and extends parallel to the floor of the tape drive unit when the guide rail assembly is fastened in place. A rectangular recess 76 is formed near the rear of the groove. This recess receives a spring-loaded roller (not shown) of the cartridge locking mechanism. Rollers on opposite sides of the receptacle engage the notches 32 (see also FIG. 1) in the opposite guide rails to lock the cartridge in its operative position with the tape engaging the head 30.

The presently preferred dimensions of the ramped door control rail are as follows. The distance D (see FIG. 4) from the front edge of the guide rail to the front of the short straight portion 60 of the recess is 1.920 inches. The distance from the front edge of the guide rail to the rear of the same portion 60 of the recess, i.e., the dimension E in FIG. 4, is 2.437 inches. Referring to FIG. 3, the first ramped portion 58 of the recess has an angle F of 20°, and the second ramped portion 62 of the recess has an angle G of approximately 30°.

Use of the ramped door control rail is best understood by referring to FIG. 2. The tape cartridge is inserted into the receptacle with the lower flanges of the cartridge housing sliding in the narrow grooves 46 in the guide rails. Referring to FIG. 2, when the cartridge is first pushed forward into the guide rails, the tripping arm 50 on the cartridge door 20 immediately engages the straight front portion 56 of the door control rail 54, which pivots the door into its fully open position. This portion of the door control rail presses in against the tripping arm sufficiently to force the door to move through a right angle against the bias of the door return spring. In its fully open position, the door extends generally parallel to the length of the guide rails.

As the cartridge is pushed forward into the receptacle, the door remains in its fully open position as long as contact is made between the straight front portion 54 of the cartridge door rail and the tripping arm of the door. When the door tripping arm reaches the position shown at 50a, i.e., at the front of the first ramped portion 58 of the cartridge door rail, the door is still in its fully open position shown at 20a. Continued forward movement of the cartridge causes the tripping arm to ride outwardly against the first ramped portion 58 of the rail. The normal bias of the door return spring automatically pivots the door toward its closed position, as the bias of the return spring holds the door tripping arm against the control rail, as shown at 50b. Therefore, as the cartridge moves forward, with the door tripping arm riding on the first ramped portion 58 of the rail, the cartridge door rotates inwardly through an angle to the position shown at 20b. Continued forward movement of the cartridge then causes the door tripping arm, shown at 50c, to ride along the straight portion 60 of the control rail which holds the door in the angular position shown at 20c. Continued forward movement of the cartridge finally causes the spring-loaded locking rollers (not shown) to engage the slots 76 in the lip below the groove 46 for locking the cartridge with the door partially open and the tape contacting the head 30. In its locked position, the door tripping arm is at the position shown at 50d at the end of the straight portion 60 of the door control rail, with the door retained in the partially open position illustrated at 20d.

In short, insertion of the cartridge into the receptacle causes the door to immediately open to its fully open position, to stay in that position for most of its travel; and during the latter portion of its travel the door gradually pivots inwardly and follows a path that appears to curl around the head without contacting the head.

When the cartridge is in the locked position, with the cartridge door in the partially open, angular position 20d shown in FIG. 2, the overall width of the tape cartridge is reduced (compared with the prior practice of leaving the door fully open while the cartridge is in the locked position). The distance H between the tip of the door and the extreme edge of the receptacle base is 5.635 inches. This distance is less than the standard 5.75 inch depth of the 5¼ inch floppy disk drive and the 5¼ inch Winchester-type disk drives. Thus, the use of the tape drive of this invention makes it possible to use the standard ¼-inch tape cartridge in a tape drive unit having the same standard external dimensions as the disk drives.

Referring again to FIG. 2, a stop pin 78 is mounted on the base of the tape drive for preventing the door from moving inwardly into contact with the head 30. The pin is mounted in a vertical position at a location between the door and the head where the pin can contact the inside edge of the door when the door moves inwardly toward the head. The positioning of the pin, as shown in FIG. 2, will ensure that the stop pin can contact the door along the full extent of travel of the cartridge along the recessed portion of the door control rail. The pin can be positioned at any point along the line indicated at 80 to ensure that the pin can contact the inner edge of the door as the door moves inwardly through an angle when contacting the ramped door control rail. In most instances, use of the pin could be avoided since the door control rail alone can control the angle through which the door moves, keeping the door away from contact with the head. However, in instances where the cartridge is either rapidly pushed into or pulled out of the receptacle, the door could momentarily deflect inwardly through a greater angle than shown and possibly contact the head. For this reason, the stop pin is provided to ensure that the door is prevented from contacting the head.

Other means of providing a stop for the cartridge door can be provided in addition to a vertical pin mounted on the base of the tape drive unit. For instance, a pin similar to pin 78 can be mounted on the upper portion of the receptacle and project downwardly toward the path 80 for contacting the inside edge of the door. Further, a small stop can be mounted on the head or on some other portion of the tape drive unit so that it can project into the path 80 for contacting the inside edge of the door.

What is claimed is:

1. A receptacle for receiving a tape cartridge to be inserted into a tape drive unit having a magnetic head, the cartridge having a tape contained in a housing, and a door on the housing for opening to expose a portion of the tape for contact with the head, the door being normally closed under the influence of a return spring and being rotatable against the control spring through an angle to a fully open position in which the tip of the door is farthest from the edge of the cartridge housing most remote from the door, the door also being rotatable to a partially open position in which the angle through which the door has rotated is less than the angle in the fully open position, so the tip of the door is closer to said remote edge of the cartridge housing than when the door is in the fully open position, the receptacle including means for engaging the cartridge housing to guide the cartridge into the receptacle toward the head, and a door control rail for contacting a portion of the door during guided movement of the cartridge along the guide means to rotate the door open against the bias of the door return spring, the door control rail having a front portion for engaging the door sufficiently to rotate it into its fully open position and a rear portion for engaging the door to rotate it into its partially open position during at least a latter portion of the cartridge travel toward the head to allow the cartridge door to clear the head during the latter portion of the cartridge travel and to retain the door in its partially open position when the tape contacts the head for reducing the overall width of the tape cartridge, compared with the width as measured from the tip of the fully open door to the edge of the cartridge housing most remote from the door.

2. Apparatus according to claim 1 in which the door control rail has a generally straight front portion for engaging the door to pivot the door to the fully open position, and a recessed rear portion that contacts the spring-biased door and allows the door to move through an angle from its fully open position to the partially open position as the cartridge is moved along the guide means toward the head.

3. Apparatus according to claim 2 in which the recessed rear portion of the door control rail comprises a generally straight, ramped rail surface that tapers outwardly away from the head for allowing the door to pivot inwardly through an angle during movement of the cartridge toward the head.

4. Apparatus according to claim 3 in which the recessed rear portion of the door control rail further comprises a second straight rail surface at the end of the ramped surface remote from the straight front portion of the door control rail, the second rail surface being spaced outwardly and extending generally parallel to the straight front portion of the door control rail.

5. Apparatus according to claim 4 in which the second straight rail surface contacts the cartridge door and retains the door in its partially open position when the cartridge is in its operative position in contact with the head.

6. Apparatus according to claim 5 including stop means between the control rail and the head for preventing contact between the door and the head.

7. Apparatus according to claim 6 in which the stop means comprises a pin positioned to engage an inside edge of the door during its angular travel toward the head to its partially open position.

8. Apparatus according to claim 1 including stop means between the control rail and the head for preventing contact between the door and the head.

9. Apparatus according to claim 8 in which the stop means comprises a pin positioned to engage an inside edge of the door during its angular travel toward the head to its partially open position.

10. A receptacle for receiving a tape cartridge to be inserted into a tape drive unit having a magnetic head, the cartridge having a tape contained in a housing, and a door on the housing for opening to expose a portion of the tape for contact with the head, the door being normally closed under the influence of a return spring and being rotatable against the control spring through an angle to a fully open position in which the tip of the door is farthest from the edge of the cartridge housing most remote from the door, the door also being rotatable to a partially open position in which the angle through which the door has rotated is less than the angle in the fully open position, so that the tip of the door is closer to said remote edge of the cartridge housing than when the door is in the fully open position, the receptacle including a door control rail for contacting a portion of the door during movement of the cartridge into the receptacle to rotate the door open against the bias of the door return spring, the door control rail having a front portion for engaging the door sufficiently to rotate it into its fully open position and a rear portion for rotating the door into its partially open position during at least a latter portion of the cartridge travel toward the head to allow the cartridge door the clear the head during the latter portion of said cartridge travel and to retain the door in its partially open position when the tape contacts the head for reducing the overall width of the tape cartridge, as compared with the width measured from the tip of the fully open door to the edge of the cartridge housing most remote from the door.

11. Apparatus according to claim 10 in which the door control rail has a generally straight front portion for engaging the door to pivot the door to its fully open position, and a recessed rear portion that contacts the spring biased door and allows the door to move through an angle from it fully open position to the partially open postion as the cartridge moves into the receptacle toward the head.

12. Apparatus according to claim 11 in which the recessed rear portion of the door control rail comprises a generally straight, ramped rail surface that tapers outwardly away from the head for allowing the door to pivot inwardly through an angle during movement of the cartridge toward the head.

13. Apparatus according to claim 12 in which the recessed rear portion of the door control rail further comprises a second straight rail surface at the end of the ramped surface remote from the straight front portion of the door control rail, the second rail surface being spaced outwardly and extending generally parallel to the straight front portion of the door control rail.

14. Apparatus according to claim 13 in which the second straight rail surface contacts the cartridge door and retains the door in its partially open position when the cartridge is in its operative position in contact with the head.

15. Apparatus according to claim 14 including stop means between the control rail and the head for preventing contact between the door and the head.

16. Apparatus according to claim 15 in which the stop means comprises a pin positioned to engage an inside edge of the door during its angular travel toward the head to its partially open position.

17. Apparatus according to claim 10 including stop means between the control rail and the head for preventing contact between the door and the head.

18. Apparatus according to claim 17 in which the stop means comprises a pin positioned to engage an inside edge of the door during its angular travel toward the head to its partially open position.

19. Apparatus according to claim 10 in which the control rail is on a guide means for engaging the cartridge housing to guide the cartridge into the receptacle toward the head.

* * * * *

UNITED STATES PATENT AND TRADEMARK OFFICE
CERTIFICATE OF CORRECTION

PATENT NO. : 4,498,112

DATED : February 5, 1985

INVENTOR(S) : Harold H. Georgens, A. Ray Brokaw

It is certified that error appears in the above-identified patent and that said Letters Patent is hereby corrected as shown below:

| | |
|---|---|
| Column 5<br>Line 13 | Change "56" (2nd occurrence) to --58--. |
| Column 7<br>Line 35; Claim 1 | After "including" add --guide--. |
| Column 8<br>Line 49; Claim 10 | Change "door the clear" to<br>--door to clear--. |
| Column 8<br>Line 62; Claim 11 | Change "it" to --its--. |
| Column 8<br>Line 63; Claim 11 | Change "postion" to --position--. |

Signed and Sealed this

First Day of October 1985

[SEAL]

Attest:

Attesting Officer

DONALD J. QUIGG

Commissioner of Patents and
Trademarks—Designate